United States Patent [19]

Di Benedetto

[11] 4,296,005
[45] Oct. 20, 1981

[54] ADDUCTS CONTAINING HYDROXYL GROUPS FROM MONONUCLEAR HYDANTOIN GLYCIDYL COMPOUNDS AND NON-AROMATIC DICARBOXYLIC ACIDS

[75] Inventor: Marianne Di Benedetto, Pleasantville, N.Y.

[73] Assignee: Ciba-Geigy Corporation, Ardsley, N.Y.

[21] Appl. No.: 200,739

[22] Filed: Oct. 27, 1980

Related U.S. Application Data

[63] Continuation-in-part of Ser. No. 107,234, Dec. 26, 1979, abandoned.

[51] Int. Cl.$^3$ .................... C08G 59/26; C08G 63/46; C08G 63/42; C08G 12/42
[52] U.S. Cl. ............... 260/18 EP; 525/510; 525/514; 528/363; 548/309
[58] Field of Search ............ 528/363; 525/514, 510; 548/309; 260/18 EP

[56] References Cited

U.S. PATENT DOCUMENTS 3,732,331  5/1973  Wollner et al. ............ 260/830 TW
4,071,477  1/1978  Seltzner et al. ............ 260/2 N

FOREIGN PATENT DOCUMENTS 883244  11/1961  United Kingdom ............ 525/514

*Primary Examiner*—Earl A. Nielsen
*Attorney, Agent, or Firm*—Harry Falber

[57] ABSTRACT

An advanced addition product containing hydroxyl groups is prepared from the reaction of specific mononuclear hydantoin glycidyl compounds with non-aromatic dicarboxylic acids of 9 to 44 carbon atoms and, optionally mono-carboxylic acids of 6 to 18 carbon atoms. The above advanced addition products are heat curable with suitable curing agents for hydroxyl containing materials to afford cured compositions exhibiting excellent weathering, color stability and chalking resistance.

14 Claims, No Drawings

ADDUCTS CONTAINING HYDROXYL GROUPS FROM MONONUCLEAR HYDANTOIN GLYCIDYL COMPOUNDS AND NON-AROMATIC DICARBOXYLIC ACIDS

RELATED APPLICATIONS

This application is a continuation-in-part of application Ser. No. 107,234, filed Dec. 26, 1979, now abandoned.

The so-called "advancement" of relatively low molecular and low-melting or liquid epoxide resins by reaction with poly-functional compounds of which the functional groups react with epoxide groups, to give relatively higher molecular, higher melting epoxide resins is known. Such a so-called "advancement" is above all intended to improve or modify, in the desired direction, the technical processing properties for certain end uses. For some end uses, for example in sintering powders, compression moulding powders and the like, an increase in the softening point or melting point can be desirable. The so-called "advancement" produces, in parallel to the increase in size of the molecule, a lowering of the epoxide group content per kilogram of resin and hence a reduction in the reactivity. This has an advantageous effect, for example when using the product as a casting and impregnating resin, in that the shrinkage on reaction becomes less and reduces the danger of cavity formation, above all in the case of larger castings.

The following represent typical patents which disclose such advancement products. U.S. Pat. Nos. 3,779,949, 3,793,248 and 3,799,894 teach that certain binuclear N-heterocyclic compounds containing one endocyclic NH group in each nucleus can be employed for advancement of a number of epoxy resins including non-aromatic resins such as N,N'-diglycidyl hydantoin products. U.S. Pat. Nos. 4,209,516 and 4,210,744 also disclose advancement of diglycidyl hydantoin compounds with binuclear bis-hydantoin compounds. It is to be noted that the latter advanced products exhibit active epoxy groups through which curing occurs. U.S. Pat. No. 4,119,595 discloses adducts of an epoxy resin and a polymerized fatty acid. The latter materials are non-heterocyclic, require excess strong acid catalyst and do not provide good weatherability performance characteristics.

DETAILED DESCRIPTION OF THE INVENTION

The subject of the present invention is an advanced addition product containing hydroxyl groups, which is obtained by heating a mixture comprising:

(a) one equivalent of a mononuclear hydantoin glycidyl compound selected from the group consisting of (1) a compound of the formula I

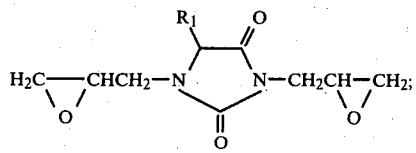

(2) a compound of the formula II

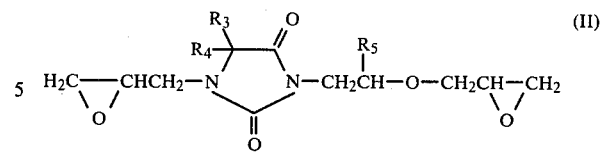

(3) a compound of the formula III

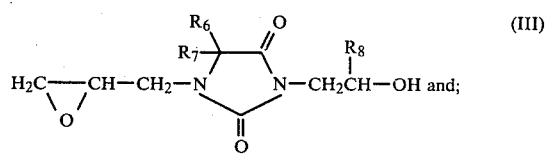

(4) any combination of compounds of the formulae I, II, or III, wherein $R_1$, $R_2$, $R_3$, $R_4$, $R_6$ and $R_7$ are independently alkyl of 1 to 8 carbon atoms or cycloalkyl of 5 to 6 carbon atoms or $R_1$ and $R_2$ together, $R_3$ and $R_4$ together and $R_6$ and $R_7$ together are tetramethylene or pentamethylene; and $R_5$ and $R_6$ independently are hydrogen or methyl;

(b) 0.7 to 2.0 equivalents of a non-aromatic dicarboxylic acid of 9 to 44 carbon atoms; and (c) 0.0 to 0.5 equivalents of a monocarboxylic acid of 6 to 18 carbon atoms.

The hydantoin of the formula IV

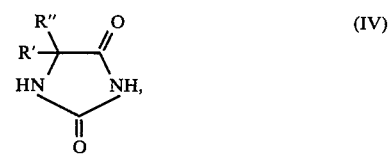

wherein $R'$ and $R''$ are independently alkyl or cycloalkyl or $R'$ and $R''$ are tetramethylene or pentamethylene, can be prepared by the well-known Bucherer synthesis employing a given ketone, sodium cyanide and ammonium carbonate. Hydantoins of the formula IV are known to react with alkylene oxides in a molar stoichiometry to afford 3-hydroxyalkyl hydantoins of the formula V

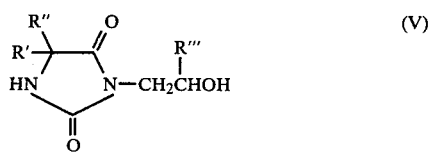

wherein $R'''$ is the alkyl radical obtained from removing the epoxide moiety from the alkylene oxide or hydrogen in the case of ethylene oxide. Hydantoins of the formula IV are also known to react with epihalohydrins to form 1,3-diglycidyl hydantoins of formula I. Similarly, the glycidylization of hydroxyalkyl hydantoins of the formula V afford, in the addition to diglycidyl hydantoins of the formula II, monoglycidyl-hydantoins of the formula III.

Mixtures of the mononuclear hydantoin glycidyl compounds may be prepared in a number of alternative methods. First, mixtures of the mononuclear hydantoin glycidyl compounds may simply be prepared by combining the individual mononuclear hydantoin glycidyl compounds. Secondly, a mixture of the mononuclear hydantoin glycidyl compounds of the formulae I, II and III, wherein the substituents in the 5,5 position of the hydantoin moiety are the same, can be prepared by the glycidylization of a mixture of hydantoins of the formula IV, and hydroxyalkyl hydantoins of the formula V, prepared by the partial reaction of a hydantoin of the formula IV with less than a stoichiometric amount of alkylene oxide. Alternative methods of producing mixtures of the mononuclear hydantoin glycidyl compounds are quite apparent to the skilled artisan.

The preferred mononuclear hydantoin glycidyl compounds are those compounds of formulae I, II or III wherein $R_1$, $R_2$, $R_3$, $R_4$, $R_6$ and $R_7$ are independently alkyl of 1 to 8 carbon atoms and $R_5$ and $R_6$ are independently hydrogen or methyl. The most preferred mononuclear hydantoin glycidyl compounds are as follows:

1,3-diglycidyl-5,5-dimethylhydantoin;
1,3-diglycidyl-5-ethyl-5-methylhydantoin;
1,3-diglycidyl-5-sec-amyl-5-ethylhydantoin;
1-glycidyl-3-(glycidyloxy-2'-propyl)-5,5-dimethylhydantoin;
1-glycidyl-3-(2'-hydroxypropyl)-5,5-dimethylhydantoin; and mixtures thereof.

The preferred non-aromatic dicarboxylic acids are those containing 17 to 36 carbon atoms. The most preferred non-aromatic dicarboxylic acids are those selected from the group consisting of aliphatic dicarboxylic acids, dibasic fatty acids and a dicarboxylic acid of the formula VI

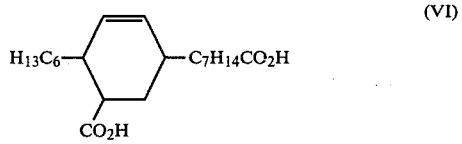

(VI)

Examples of the aliphatic dicarboxylic acids which may be employed in the instant invention are azelaic acid, sebacic acid, 1,10-decanedicarboxylic acid, 1,11-undecanedicarboxylic acid and undecanedioic acid. Examples of dibasic fatty acids are obtained by the dimerization of olefinic fatty acids employing known synthetic methods. The olefinic fatty acids which may be dimerized to form the dibasic fatty acids include oleic acid, ricinoleic acid, petroselinic acid, vaccenic acid, linoleic acid, linolenic acid, eleostearic acid, punicic acid, licanic acid, parimaric acid and the like or mixtures thereof. The dibasic fatty acids which are commercially available consist essentially of the dimerized fatty acids containing 36 carbon atoms with minor amounts of monobasic fatty acids of 18 carbon atoms and tribasic fatty acids of 51 carbon atoms.

The $C_{21}$ dicarboxylic acid of the formula VI

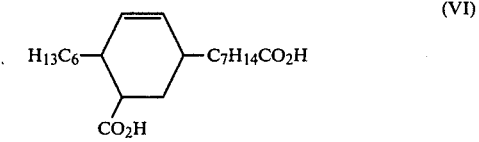

(VI)

is commercially available from Westvaco Chemical Division, Charleston Heights, S.C., under the name Westvaco Diacid 1550 and prepared via a Diels-Alder cyclo-addition of acrylic acid with a conjugated mono- acid of the formula $H_{13}C_6-CH=CH-CH=CH-C_7H_{14}-CO_2H$.

Examples of the monocarboxylic acid which may be employed with the non-aromatic dicarboxylic acid in the instant invention include caprylic acid, lauric acid, myristic acid, palmitic acid, stearic acid, arachidic acid, decylenic acid, dodecylenic acid, oleic acid, ricinoleic acid and linolenic acid.

The new adducts of this invention are manufactured by heating the non-aromatic dicarboxylic acid or a mixture of the non-aromatic dicarboxylic acid and the monocarboxylic acid with the mononuclear hydantoin glycidyl compounds at a temperature between 100° and 250° and preferably 150° to 200° C. Preferably, 0.8 to 1.2 equivalents of the non-aromatic dicarboxylic acid is reacted with one equivalent of the mononuclear hydantoin glycidyl compound.

The reaction can be accelerated by adding suitable catalysts. Such catalysts are for example alkali hydroxides such as sodium hydroxide or alkali halides such as lithium chloride, potassium chloride and sodium chloride, bromide or fluoride; tertiary amines such as triethylamine, tri-n-propylamine, benzyldimethylamine, N,N'-di-methylaniline and triethanolamine; quaternary ammonium hydroxides such as benzyltrimethylammonium hydroxide; quaternary ammonium salts such as tetramethylammonium chloride, tetraethylammonium chloride, benzyltrimethylammonium chloride, benzyltrimethylammonium acetate or methyltriethylammonium chloride; hydrazines having a tertiary nitrogen atom, such as 1,1-dimethylhydrazine, which can also be employed in the quaternized form.

Depending on the choice of the starting substances the reaction takes place, quantitatively, so rapidly that no addition of catalyst is necessary. Whilst the starting substances may be mixed with one another at room temperature and then brought to the reaction temperature, it is advantageous in the case of very viscous and reactive components for the non-aromatic dicarboxylic acid or the mixture of the non-aromatic dicarboxylic acid and the mono-carboxylic acid to be heated to the requisite reaction temperature and the nononuclear hydantoin glycidyl compounds gradually added. The progress of the reaction can be followed by titration of the epoxide groups using samples taken during the reaction; the end product will contain a defined, constant epoxide group content of less than 0.7 equivalent/kg, and preferably 0.0 to 0.5 equivalent/kg.

The advanced addition products of the instant invention have a molecular weight range from 600 to 15,000, and preferably 800 to 3,000. The advanced addition products are usually viscous liquids at ambient temperature but, in the case of the higher molecular weight products, may be solid. The advanced addition products contain a high content of hydroxyl groups as evidenced by a hydroxyl number of 80 to 160. The color of these advanced addition products is generally a light amber.

Because of their high content of free hydroxyl groups, these advanced addition products react with the usual curing agents for hydroxyl containing compounds, and can, therefore, be crosslinked or cured by adding such curing agents.

A preferred curing agent includes the so-called amino resins of amino-plasts containing $-NH_2$ groups derived from urea and melamine. Suitable amino-containing resins are prepared by reacting urea or melamine with formaldehyde under well-known conditions to form a reaction monomer first and then, by condensation polymerization, a large number of varying types of polymeric intermediates are formed. The preparation of urea-formaldehyde and melamine-formaldehyde resins is well known in the art and forms no part of the present invention. Their use in crosslinking epoxy resins mostly through methylol groups is also well known. Accordingly, a large number of amino-plast and phenol-plast resins, i.e., urea-formaldehyde and melamino-formaldehyde resins, are commercially available under such trade designations as Plaskon, Beetle, Cymel, Fiberite, Resimene, Curacron and Beckamine, among many others.

The amount of curing agent employed to cure the advanced addition products may vary with respect to the type of advanced addition product to be cured and the curing agent to be employed. Generally, a weight ratio of advanced addition product to aminoplast resin employed would be from 95:5 to about 70:30, and preferably from 90:10 to about 75:25.

The above compositions containing the advanced addition product and curing agent are heat curable at temperatures over 150° C., and preferably cured at temperatures between 180° and 250° C.

To accelerate the curing process an acidic curing-accelerator, well known in the art, can be added to the heat curable mixture. Examples for accelerators are strong organic and inorganic acids such as para-toluene sulfonic acid, sulfuric acid and phosphoric acid or derivatives thereof such as the ammonia or amine salts. The amount of the curing accelerator may be less than 2 percent by weight of the advanced addition product, preferably less than 1 percent by weight.

The expression "cure", as used here, denotes the conversion of the above adducts, containing hydroxyl groups, into insoluble and infusible crosslinked products, as a rule with simultaneous shaping to give shaped articles such as castings, pressings or laminates, or to give two-dimensional structures such as coatings, enamel films or adhesives bonds.

The heat curable compositions are employed mainly in the field of surface protection. The resultant cured coatings are suitable for application areas such as coil, appliance, automotive and metal decorating. The present coating composition may be applied to a suitable substrate by any suitable means such as spraying, dipping, brushing, painting or roller coating. After the desired film thickness is applied to a suitable substrate, the coated substrate is baked at temperatures over 150° C. for sufficient time to cure the films.

The resultant cured coatings are void-free and possess excellent physical properties of chemical resistance. Specifically, the coatings are highly resistant to chalking, salt spray and humidity. The cured coating also exhibit excellent weather resistance.

The following examples are illustrative of the instant invention. All parts are based on parts by weight.

TABLE OF GLYCIDYL COMPOUNDS

A—1,3-diglycidyl-5,5-dimethylhydantoin
B—1,3-diglycidyl-5-ethyl-5-methylhydantoin
C—1,3-diglycidyl-5-sec-amyl-5-ethylhydantoin
D—1-glycidyl-3-(glycidyloxy-2'-propyl)-5,5-dimethylhydantoin
E—1-glycidyl-3-(2'-hydroxypropyl)-5,5-dimethylhydantoin

A. PREPARATION OF ADVANCED ADDITION PRODUCTS

EXAMPLE 1

The dicarboxylic acid of the formula VI (415.6 parts) was charged into a one liter, 3 neck round bottom flask equipped with a thermometer, nitrogen inlet tube, and a mechanical stirrer. The acid was heated to a temperature of 175°–183° C. with stirring in a nitrogen atmosphere.

A mixture of glycidyl compound C (199.3 parts), glycidyl compound D (135.5 parts) and glycidyl compound E (58.1 parts) was added portion-wise over a period of 20 minutes to the heated acid (0.83 equivalents of acid to 1.0 equivalent of glycidyl compounds). After the addition was complete, the reaction was monitored by periodic epoxy value determination. The reaction was essentially complete after 16 minutes when the epoxy value of 0.57 equiv./kg was obtained. The resulting advanced addition product (Adduct J) had an acid number of 8 and a hydroxyl number of 117. Adduct J (80 parts) was dissolved in methyl ethyl ketone (20 parts) to afford a coating composition.

EXAMPLE 2

Adduct K, Adduct L and Adduct M were prepared employing 0.83 equivalents of the dicarboxylic acid of the formula VI with 1.0 equivalents of the glycidyl compounds in the following table according to Example 1.

| Glycidyl Compound | Adduct | Epoxy Value Equiv./Kg. | Hydroxyl Number | Acid Number |
| --- | --- | --- | --- | --- |
| B | K | 0.45 | 152 | 8 |
| D (70 parts) E (30 parts) | L | 0.56 | 91 | — |
| A (70 parts) D (21 parts) E (9 parts) | M | 0.62 | 125 | 2 |

EXAMPLE 3

Adduct N was prepared according to Example 1 except a dibasic fatty acid of 36 carbon atoms (578 parts) was employed in place of the dicarboxylic acid of formula VI (0.83 equivalents of acid to 1.0 equivalent of glycidyl compounds). Adduct N had an epoxy value of 0.63 equiv./kg., an acid number of 9 and a hydroxyl number of 95.

EXAMPLE 4

The dicarboxylic acid of the formula VI (187.0 parts) and oleic acid (28.3 parts) were combined in a one liter, 3-neck round bottom flask equipped with a thermometer, a nitrogen inlet tube, and a mechanical stirrer. The mixture was heated to a temperature of 170°–175° C. with stirring in a nitrogen atmosphere.

A mixture of glycidyl compound C (83.1 parts) and glycidyl compound D (80.7 parts) was added portion-wise over a period of 20 minutes to the heated acid (1.0 equivalent of acid to 1.0 equivalent of glycidyl compounds). After the addition was complete, the reaction was monitored by periodic epoxy value determination. The reaction was essentially complete after 32 minutes when the epoxy value of 0.32 equiv./kg. was attained. The resulting advanced addition product (Adduct O) had an acid number of 26.6 and a hydroxyl number of 148. Adduct O (80 parts) was dissolved in methyl ethyl ketone (20 parts) to afford a coating composition.

EXAMPLE 5

The dicarboxylic acid of the formula VI (270.8 g.) was charged to a one liter, 3-neck round bottom flask equipped with a thermometer, a nitrogen inlet tube, and a mechanical stirrer. The acid was heated to a temperature of 175°–183° C. with stirring in a nitrogen atmosphere.

A mixture of glycidyl compound A (127.5 parts), glycidyl compound D (38.3 parts) and glycidyl compound E (16.4 parts) was added portionwise at this temperature over a period of 28 minutes (1.0 equivalent of acid to 1.0 equivalent of glycidyl compounds). After the addition was complete, the reaction was monitored by periodic epoxy value determination.

The reaction was essentially complete after 25 minutes when the epoxy value of 0.62 was attained. The resulting advanced addition product (Adduct P) had an acid number which was undetectable and a hydroxyl number of 125. Adduct P (80 parts) was dissolved in methyl ethyl ketone (20 parts) to afford a coating composition.

EXAMPLE 6

The dicarboxylic acid of the formula VI (498.8 parts) was charged to a one liter, 3-neck round bottom flask equipped with a thermometer, a nitrogen inlet tube and a mechanical stirrer. The acid was heated to 175°–180° C. with stirring in a nitrogen atmosphere.

Glycidyl compound B (267.4 parts) was added portionwise over a 20 minute period to the heated acid (1.2 equivalents of acid to 1.0 equivalent of glycidyl compound). After the addition was complete, the reaction was continued for 85 minutes further. The advanced addition product (Adduct Q) had an epoxy value of 0.07 eq./kg., an acid number of 37 and a hydroxyl number of 147. Adduct Q (80 parts) was dissolved in methyl ethyl ketone (20 parts) to afford a coating composition having a Gardner bubble viscosity of $Z_3$–$Z_4$.

EXAMPLE 7

The dicarboxylic acid of formula VI (311.7) was charged to one liter, 3-neck round bottom flask equipped with a thermometer, a nitrogen inlet tube, and a mechanical stirrer. The acid was heated to a temperature of 185°–190° C. with stirring in a nitrogen atmosphere.

A mixture of glycidyl compound D (112.9 parts) and glycidyl compound E (48.4 parts) was added portionwise at this temperature over a period of 33 minutes (0.75 equivalents of acid to 1.0 equivalent of glycidyl compounds). The reaction was essentially complete after a period of 2 hours when an epoxy value of 0.27 eq./kg was attained. The resulting advanced addition product (Adduct S) had an acid number of 60 and a hydroxyl number of 119.

EXAMPLE 8

Adduct T was prepared according to Example 7 except glycidyl compound B (133.7 parts) was employed in place of the mixture of glycidyl compounds (0.75 equivalents of acid to 1.0 equivalent of glycidyl compound). The reaction was essentially complete after a period of one hour when an epoxy value of 0.26 equiv./kg was attained. Adduct T had an acid number of 60 and a hydroxyl number of 126.

EXAMPLE 9

The dicarboxylic acid of formula VI (415.6 parts) was heated to a temperature of 175°–180° C. The equipment and condition used were the same as those of Example 5.

A mixture of glycidyl compound A (99.6 parts), glycidyl compound D (30.0 parts) and glycidyl compound E (13.1 parts) was then added portionwise over a period of 21 minutes to the heated diacid (2.0 equivalents of acid to 1.0 equivalent of glycidyl compounds). After the addition was complete, the reaction was monitored by periodic epoxy value determination. The reaction was essentially complete after 70 minutes when an epoxy value of 0.02 equiv./kg was attained. The resulting advanced addition product (Adduct M) had an acid number of 92 and a hydroxyl number of 95.

EXAMPLE 10

Adduct V was prepared according to Example 9 except glycidyl compound C (166.1 parts) was employed in place of the mixture of glycidyl compounds (2.0 equivalents of acid to 1.0 equivalent of glycidyl compound). Adduct V has an epoxy value of 0.02 equiv./kg, an acid number of 89 and a hydroxyl number of 95.

EXAMPLE 11

Adduct W was prepared according to Example 9 except a mixture of glycidyl compound D (112.9 parts) and glycidyl compound E (48.4 parts) was employed in place of the mixture of glycidyl compounds A and D (2.0 equivalents of acid to 1.0 equivalent of glycidyl compound). Adduct W had an epoxy value which was undetectable, an acid number of 88 and a hydroxyl number of 97.

B. APPLICATION AND TESTING

EXAMPLE 1

Adduct J was formulated into a high solids enamel by blending on a paint shaker: Adduct J (160.00 parts) (80% weight solids in methyl ethyl ketone); Cymel 303, an alkylated melamine-formaldehyde resin from American Cyanamid (32.00 parts); FC 430, flow control agent from 3 M Company (0.06 parts); Curing Agent "C", morpholine salt of p-toluene sulfonic acid from American Biosynthetics; and methyl ethyl ketone (8.00 parts). The above formulation (200.40 parts) was combined with Titanox 2060 (80.00 parts), a titanium dioxide pigment from NL Industries, and ground with sand to Hegman Gauge of 8. The pigmented formulation was then let down with additional methyl ethyl ketone (39.40 parts).

The above high solids enamel possessed the following properties:

| FORMULATION PROPERTIES | |
| --- | --- |
| Hardener | Cymel 303 |
| Resin/Hardener Ratio | 80/20 |
| Binder/Pigment Ratio | 2:1 |
| % Solids in MEK (by Weight) | 75 |
| Viscosity, sec. (#4 Ford Cup)[1] | 28 |
| Curing Agent "C" | 0.5% |

[1]Determined according to ASTM 1200.

The formulated material was drawn into films on Alodine 1200[2] treated aluminum and cured at a peak metal temperature (PMT) of 232° C. for 50 seconds. The resulting films possessed the following properties:
[2]Chromium oxide conversion coating

| FILM PROPERTIES OBTAINED | | |
|---|---|---|
| | | Industry Requirements |
| Pencil Hardness | F | F (HB minimum) |
| "T" Bend[3] | 2-3T | 2T maximum |
| MEK Rubs, double | 50 | 50 |
| Cross-Cut Adhesion | Excellent | Excellent |
| Reverse Impact (CM Kg) | 17-23 | 34-57 (18 minimum) |
| Cure Schedule, P.M.T., 232° C. | 50 sec. | 45-60 sec. |
| Dry Film Thickness | 1-1.2 mils | 0.8-1 mil |
| Fuming Factor[4] | 3% | 5% |

[3]Test utilized to determine degree of deformation of a coated sheet of metal coil. Test described in Paint Testing Manual, ed. G. G. Sword, p. 334, Section 5.4.4.2.
[4]Continental Can Company, Inc. procedure for determining percent loss of solids due to non-solvent volatilization when enamel baked at 232° C.

RESISTANCE TO YELLOWING

These films were tested for color stability exposure to accelerated weathering studies in a commercial dew cycle, carbon arc Weatherometer.

| COLOR DIFFERENCE READINGS[2] | | | | | |
|---|---|---|---|---|---|
| Hydantoin-Based Resin | | Acrylic-Based Resin | | Bisphenol A Epoxy Resin | |
| $R_d$ | b | $R_d$ | b | $R_d$ | b |
| Initial 79.6 | +0.9 | 75.0 | +1.3 | 84.0 | +0.9 |
| 3 Months 80.5 | +0.8 | 75.4 | +0.9 | 82.8 | +1.9 |
| 6 Months 79.9 | +1.1 | 74.9 | +1.1 | 80.7 | +4.2 |

[1]Tested according to ASTM D2244-68
[2]+ Δ $R_d$ = Lighter
− Δ $R_d$ = Darker
+ Δ b = Yellower (less Blue)
− Δ b = Bluer (less Yellow)

ACCELERATED WEATHERING STUDY

The films were also subjected to an accelerated weathering study in a commercial dew cycle Weatherometer using a carbon arc light source. Controls were a commercially available acrylic[1] and a conventional bisphenol A-based epoxy system.
[1]Acryloid OL-42 from Rohm and Haas

| | | Sub-trate[2] | Ini-tial | 60° ¢ 500 Hrs | 1000 Hrs | 2000 Hrs |
|---|---|---|---|---|---|---|
| (1) | Hydantoin-Based Resin | AA | 81 | 75 | 74 | 68 |
| | | B-37 | 86 | 82 | 79 | 78 |
| (2) | Acrylic-Based Resin | AA | 72 | 69 | 45 | 65 |
| | | B-37 | 79 | 76 | 67 | 65 |
| (3) | Bisphenol A-Epoxy Resin | AA | 85 | 25 | 20 | 9 |
| | | B-37 | 89 | 30 | 21 | 8 |

No chalking or yellowing was observed with resins 1 and 2.
Heavy chalking and noticeable yellowing was observed with resin 3.
[2]AA = Alodine 1200 Aluminum
B-37 = Bonderite Steel #37

SALT SPRAY AND HUMIDITY RESISTANCE TESTING

The films were tested for salt spray (ASTM B117) and humidity resistance (ASTM D 2247); results are tabulated in Table I, page 25. Acryloid OL-42 from Rohm and Haas served as the control.

Except where noted, no blistering, chalking or peeling occurred.

TABLE I

| TEST | | | | | | |
|---|---|---|---|---|---|---|
| | | | Hydantoin Based Resin (1) | | | |
| Hours: | Substrate | Initial | 500 | 1000 | 2000 | 3000 |
| Salt Spray (5% Solution) | AA | 82 | 85 | 83 | 80 | — |
| | B-37 | 84 | 90 (Slight Blistering) | 86 (Heavy Blistering) | — | — |
| Humidity Cabinet | AA | 83 | 87 | 87 | 79 | 74 |
| | B-37 | 85 | 88 | 89 | 85 | 84 |
| | | | Acrylic Based Resin (2) | | | |
| Hours: | Substrate | Initial | 500 | 1000 | 2000 | 3000 |
| Salt Spray (5% Solution) | AA | 61 | 72 | 72 | 75 | — |
| | B-37 | 77 | 67 (Slight Blistering) | 82 (Heavy Blistering) | — | — |
| Humidity Cabinet | AA | 55 | 67 | 65 | 72 | 66 |
| | B-37 | 82 | 91 | 86 | 83 | 72 (Surface covered with tiny blisters) |

EXAMPLE 2

Adduct L was formulated into a high solids formulation according to the procedure followed in Example 1 of the testing section. The resulting formulation possessed the following properties:

| FORMULATION PROPERTIES | |
|---|---|
| Hardener | Cymel 303 |
| Resin/Hardener Ratio | 80/20 |
| Binder/Pigment Ratio | 2:1 |
| % Solids in MEK (by weight) | 75.3 |
| Viscosity, sec. (#4 Ford Cup) | 31 |
| Curing Agent "C" | 0.34% |

The formulated material was drawn into films on Alodine 1200 treated aluminum and cured at a peak metal temperature (PMT) of 232° C. for 60 sec. The resulting films possessed the following properties:

| FILM PROPERTIES OBTAINED | |
|---|---|
| Pencil Hardness | HB |
| "T" Bend | 0-1 T |
| MEK Rubs, Double | 50 |
| Cross-Cut Adhesion | Excellent |
| Reverse Impact, (cm kg) | 23 |
| Cure Schedule, P.M.T., (232° C.) | 60 sec. |
| Dry Film Thickness | 0.9-1.0 mil (22.5-25.0 μm) |
| Fuming Factor | 5-6% |

EXAMPLE 3

Adduct J (74.38 parts) (80% weight solids in methyl ethyl ketone) was combined with Cymel 303 (10.50 parts), methyl ethyl ketone (15.12 parts) and Curing Agent "C" (0.1 parts) to produce a one component, clear high solids formulation. This was placed in stability testing at 25° C. The formulation exhibited an initial Gardner viscosity of H and viscosity of I-J after 10 months.

A similar formulation containing glycidyl compound A exhibited an initial Gardner viscosity of K-1 and a viscosity of N-0 after 10 months.

EXAMPLE 4

Gloss Retention and Chalk Resistance

The Adduct S was formulated with Cymel 303 according to Example 1 and cured at a PMT of 232° C. for 50 seconds. The substrate was Alodine 1200 aluminum.

The cured films were tested for gloss retention and chalk resistance after exposure in a dew cycle, carbon arc Weatherometer.

|  | 60° ⊀Gloss Readings | | | | | | |
|---|---|---|---|---|---|---|---|
|  | Initial | 24 | 96 | 213 | 453 | 525 | 785 |
| (1) Hydantoin-Based Resin | 81 | 82 | 80 | 82 | 76 | 79 | 71 |
| (3) Bisphenol A Epoxy Resin | 90 | 89 | 86 | 78 | 47 | 23 | 20 |

Chalking was observed after 453 hours with the bisphenol A epoxy resin. None was observed with the hydantoin-based material.

RESISTANCE TO YELLOWING

Adduct S was formulated with Cymel 303 according to Example 1 and cured at a temperature of 450° F. for 50 seconds. The substrate was Alodine 1200 aluminum.

The cured films were tested for resistance to yellowing after Weatherometer exposure.

|  | COLOR DIFFERENCE READINGS* | | | |
|---|---|---|---|---|
|  | Hydantoin-Based Resin | | Bisphenol A Epoxy Resin | |
| Exposure Time (Hours) | $R_d$ | b | $R_d$ | b |
| Initial | 79 | +1.1 | 84 | +0.9 |
| 24 | 81 | −0.2 | 84 | +0.9 |
| 96 | 80 | −0.2 | 84 | +1.0 |
| 213 | 81 | −0.2 | 84 | +1.1 |
| 453 | 80 | −0.5 | 83 | +1.4 |
| 525 | 80 | −0.1 | 83 | +1.6 |
| 785 | 80 | −0.4 | 82 | +1.9 |
| 1409 | 82 | −0.4 | 80 | +3.6 |

*Tested according to ASTM D2244-68
+ Δ = Lighter
− Δ $R_d$ = Darker
+ Δ b = Yellower (less Blue)
− Δ b = Bluer (less Yellow)

Summarizing, it is seen that this invention provides advanced addition products which afford cured compositions exhibiting excellent weathering characteristics, color stability and chalking resistance. Variations may be made in proportion materials and procedures without departing from the scope of the invention as defined in the following claims.

What is claimed is:

1. An advanced addition product containing hydroxyl groups, which is obtained by heating a mixture comprising:
   (a) one equivalent of a mononuclear hydantoin glycidyl compound selected from the group consisting of
      (1) a compound of the formula I

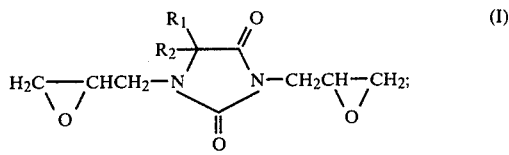

(2) a compound of the formula II

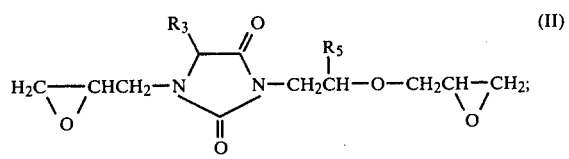

(3) a compound of the formula III

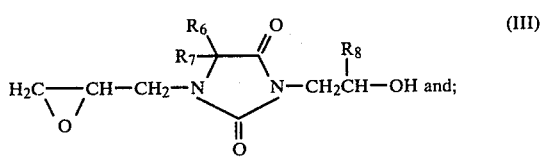

(4) any combination of compounds of the formulae I, II, or III,
   wherein $R_1$, $R_2$, $R_3$, $R_4$, $R_6$ and $R_7$ are independently alkyl of 1 to 8 carbon atoms or cycloalkyl of 5 to 6 carbon atoms or $R_1$ and $R_2$ together, $R_3$ and $R_4$ together and $R_6$ and $R_7$ together are tetramethylene or pentamethylene, and $R_5$ and $R_8$ independently are hydrogen or methyl;
   (b) 0.7 to 2.0 equivalents of a non-aromatic dicarboxylic acid of 9 to 44 carbon atoms; and
   (c) 0.0 to 0.5 equivalents of a monocarboxylic acid of 6 to 18 carbon atoms.

2. An advanced addition product according to claim 1 wherein $R_1$, $R_2$, $R_3$, $R_4$, $R_6$ and $R_7$ are independently alkyl to 1 to 8 carbon atoms.

3. An advanced addition product according to claim 1 wherein the mononuclear hydantoin glycidyl compound is selected from the group consisting of
   1,3-diglycidyl-5,5-dimethylhydantoin;
   1,3-diglycidyl-5-ethyl-5-methylhydantoin;
   1,3-diglycidyl-5-sec-amyl-5-ethylhydantoin;
   1-glycidyl-3-(glycidyloxy-2'-propyl)-5,5-dimethylhydantoin;
   1-glycidyl-3-(2'-hydroxypropyl)-5,5-dimethylhydantoin; and mixtures thereof.

4. An advanced addition product according to claim 1, wherein the non-aromatic dicarboxylic acid contains 17 to 36 carbon atoms.

5. An advanced addition product according to claim 1, wherein the non-aromatic dicarboxylic acid is selected from the group consisting of aliphatic dicarboxylic acids, dibasic fatty acids and a dicarboxylic acid of the formula VI

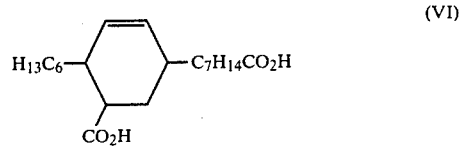

6. An advanced addition product, according to claim 1, prepared by heating a mixture of (a) 1,3-diglycidyl-5-sec-amyl-5-ethylhydantoin, 1-glycidyl-3-(glycidyloxy-2'-propyl)-5,5-dimethylhydantoin, and 1-glycidyl-3-(2'-hydroxypropyl)-5,5-dimethylhydantoin and (b) a dicarboxylic acid of the formula VI

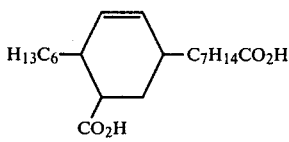
(VI)

7. An advanced addition product, according to claim 1, prepared by heating a mixture of (a) 1,3-diglycidyl-5-ethyl-5-methylhydantoin and (b) a dicarboxylic acid of the formula VI

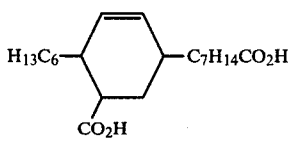
(VI)

8. An advanced addition product, according to claim 1, prepared by heating a mixture of (a) 1-glycidyl-3-(glycidyloxy-2'-propyl)-5,5-dimethylhydantoin and 1-glycidyl-3-(-2'-hydroxypropyl)5,5-dimethylhydantoin and (b) a dicarboxylic acid of the formula VI

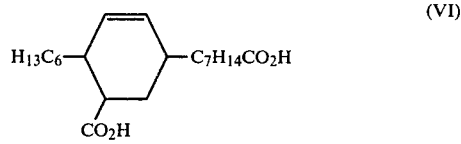
(VI)

9. An advanced addition product, according to claim 1, prepared by heating a mixture of (a) 1,3-diglycidyl-5,5-dimethylhydantoin, 1-glycidyl-3-(glycidyloxy-2'-propyl)-5,5-dimethylhydantoin and 1-glycidyl-3-(2'-hydroxypropyl)-5,5-dimethylhydantoin and (b) a dicarboxylic acid of the formula VI

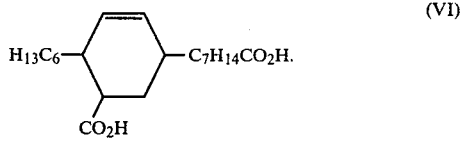
(VI)

10. An advanced addition product, according to claim 1, prepared by heating a mixture of (a) 1,3-diglycidyl-5-sec-amyl-5-ethylhydantoin, 1-glycidyl-3-(glycidyloxy-2'-propyl)-5,5-dimethylhydantoin and 1-glycidyl-3-(2'-hydroxypropyl)-5,5-dimethylhydantoin and (b) a dibasic fatty acid of 36 carbon atoms.

11. An advanced addition product, according to claim 1, prepared by heating a mixture consisting essentially of (a) one equivalent of the mononuclear hydantoin glycidyl compound; and (b) 0.8 to 1.2 equivalents of the non-aromatic dicarboxylic acid.

12. A heat curable composition which comprises an advanced addition product containing hydroxyl groups according to claim 1 and a curing agent therefor.

13. A heat curable composition according to claim 12, wherein the curing agent is an aminoplast.

14. A heat curable composition according to claim 13 wherein the aminoplast is a melamine-formaldehyde resin or an urea-formaldehyde resin.

* * * * *

UNITED STATES PATENT AND TRADEMARK OFFICE
CERTIFICATE OF CORRECTION

PATENT NO. : 4,296,005
DATED : OCTOBER 20, 1981
INVENTOR(S) : MARIANNE DI BENEDETTO

It is certified that error appears in the above—identified patent and that said Letters Patent is hereby corrected as shown below:

Claim 1, Column 12, line 13, Formula II reads:

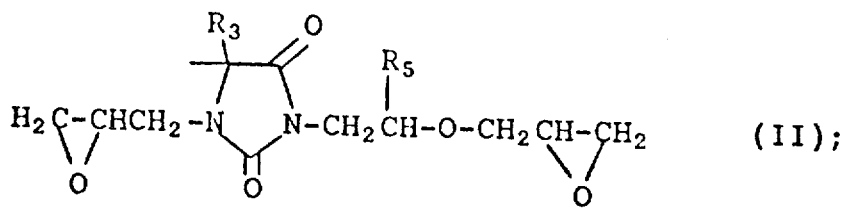

Should read:

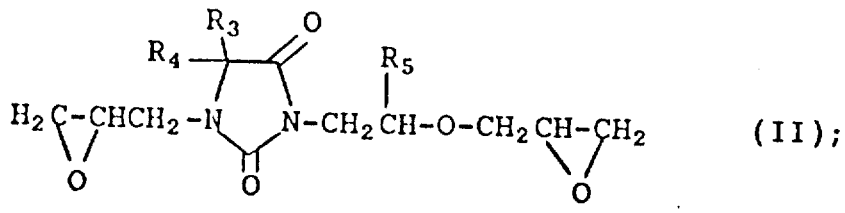

Signed and Sealed this

Twenty-third Day of March 1982

[SEAL]

Attest:

Attesting Officer

GERALD J. MOSSINGHOFF
Commissioner of Patents and Trademarks